(12) United States Patent
Stewart

(10) Patent No.: US 8,920,089 B1
(45) Date of Patent: Dec. 30, 2014

(54) DEVICE FOR SECURING A PANEL TO A MOUNTING STUD

(75) Inventor: Robert E. Stewart, Farmington Hills, MI (US)

(73) Assignee: Alpha Stamping Company, Livonia, MI (US)

( * ) Notice: Subject to any disclaimer, the term of this patent is extended or adjusted under 35 U.S.C. 154(b) by 79 days.

(21) Appl. No.: 13/164,271

(22) Filed: Jun. 20, 2011

(51) Int. Cl.
 F16B 21/18 (2006.01)
 F16B 41/00 (2006.01)
 F16B 5/02 (2006.01)
 F16B 37/02 (2006.01)
 F16B 37/08 (2006.01)

(52) U.S. Cl.
 CPC ............. *F16B 41/002* (2013.01); *F16B 5/0208* (2013.01); *F16B 37/02* (2013.01); *F16B 37/0857* (2013.01); *Y10S 411/97* (2013.01)
 USPC ........... 411/352; 411/112; 411/433; 411/527; 411/970

(58) Field of Classification Search
 USPC ............. 16/2.1; 411/525, 526, 527, 970, 112, 411/433
 See application file for complete search history.

(56) References Cited

U.S. PATENT DOCUMENTS

| 233,255 | A | * | 10/1880 | Kimble | 24/658 |
|---|---|---|---|---|---|
| RE21,769 | E | * | 4/1941 | Tinnerman | 411/524 |
| 2,342,832 | A | * | 2/1944 | Borchers | 292/17 |
| 2,539,172 | A | * | 1/1951 | Andrews | 248/27.3 |
| 3,192,823 | A | * | 7/1965 | Munse | 411/15 |
| 3,379,090 | A | * | 4/1968 | Parkin | 411/427 |
| 4,034,788 | A | * | 7/1977 | Melone | 411/134 |
| 4,656,689 | A | * | 4/1987 | Dennis | 16/2.2 |
| 5,537,714 | A | * | 7/1996 | Lynch et al. | 16/2.1 |
| 5,897,281 | A | * | 4/1999 | Haga et al. | 411/525 |
| 7,001,128 | B2 | * | 2/2006 | Kuntze | 411/508 |
| 7,895,709 | B2 | * | 3/2011 | Shishikura | 16/2.1 |
| 2001/0004434 | A1 | * | 6/2001 | Kilgore | 411/526 |
| 2009/0074534 | A1 | * | 3/2009 | Yin et al. | 411/112 |
| 2010/0043171 | A1 | * | 2/2010 | Kwon | 16/2.1 |

FOREIGN PATENT DOCUMENTS

DE 19733771 C1 * 6/1999
WO WO 9908006 A1 * 2/1999

* cited by examiner

Primary Examiner — Victor Batson
Assistant Examiner — Caroline L Natirboff
(74) Attorney, Agent, or Firm — Reising Ethington PC

(57) ABSTRACT

A device for securing a panel or the like to a mounting stud having external teeth includes an annular first body having an inner periphery and at least one lock finger extending from such inner periphery. An annular second body has a center opening, at least one lock opening spaced from the center opening for receiving the lock finger to lock the first and second bodies together, and at least one leg extending inwardly overlying the center opening for engaging the external teeth on the mounting stud. The second body is adapted for assembly to the first body with a panel or the like between the bodies such that the center opening can be mounted over the mounting stud with the at least one finger engaging the teeth on the mounting stud to prevent removal.

14 Claims, 2 Drawing Sheets

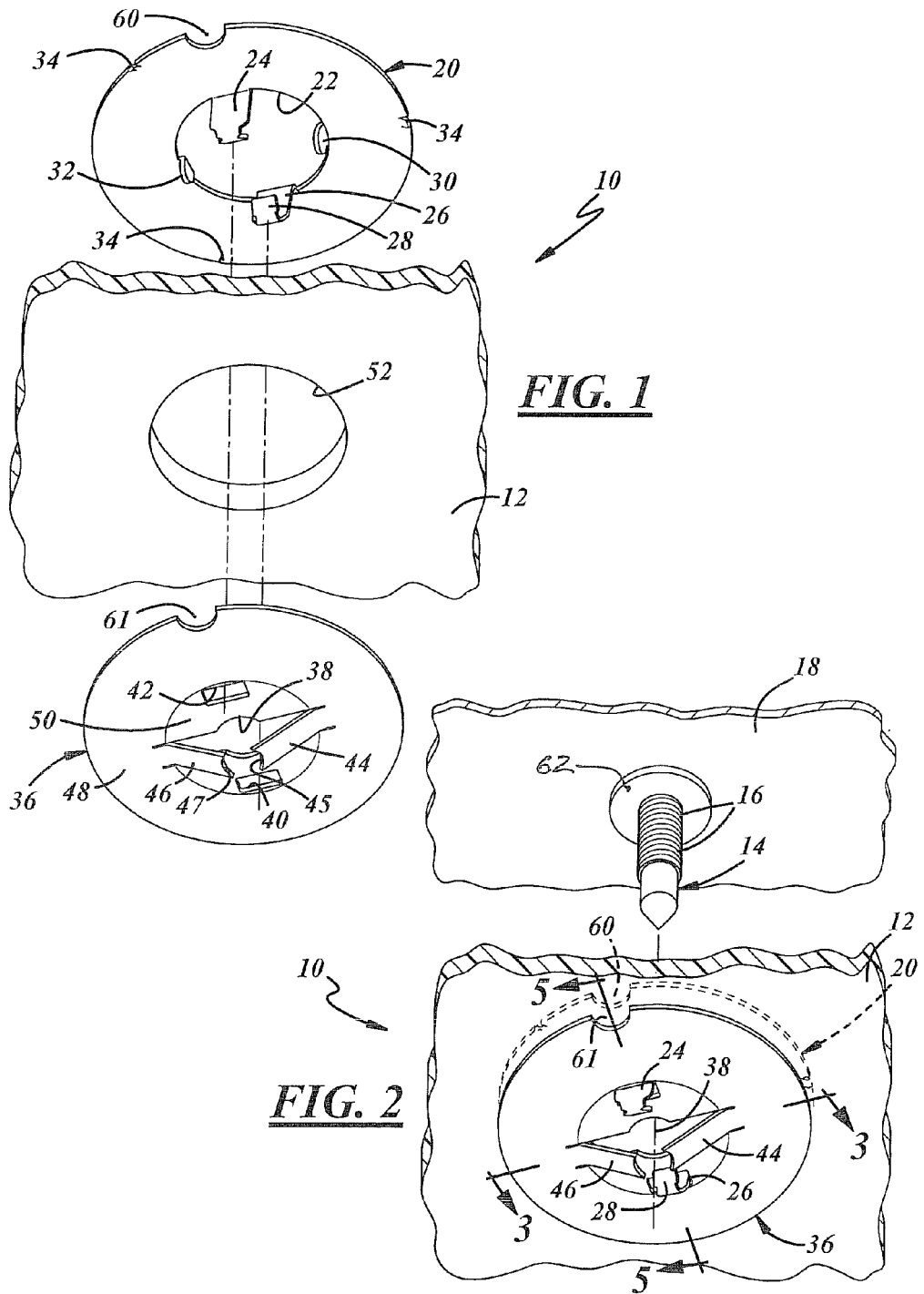

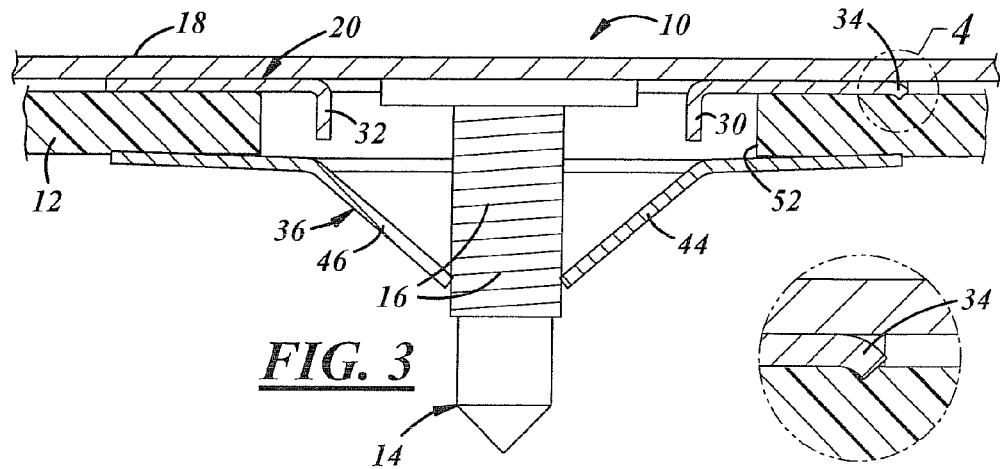
FIG. 3
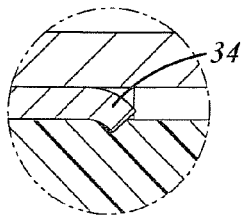
FIG. 4
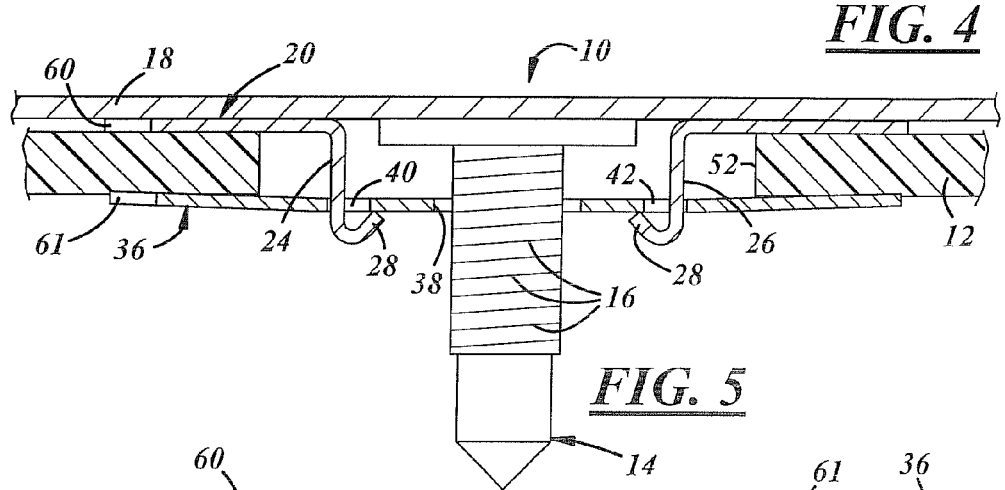
FIG. 5
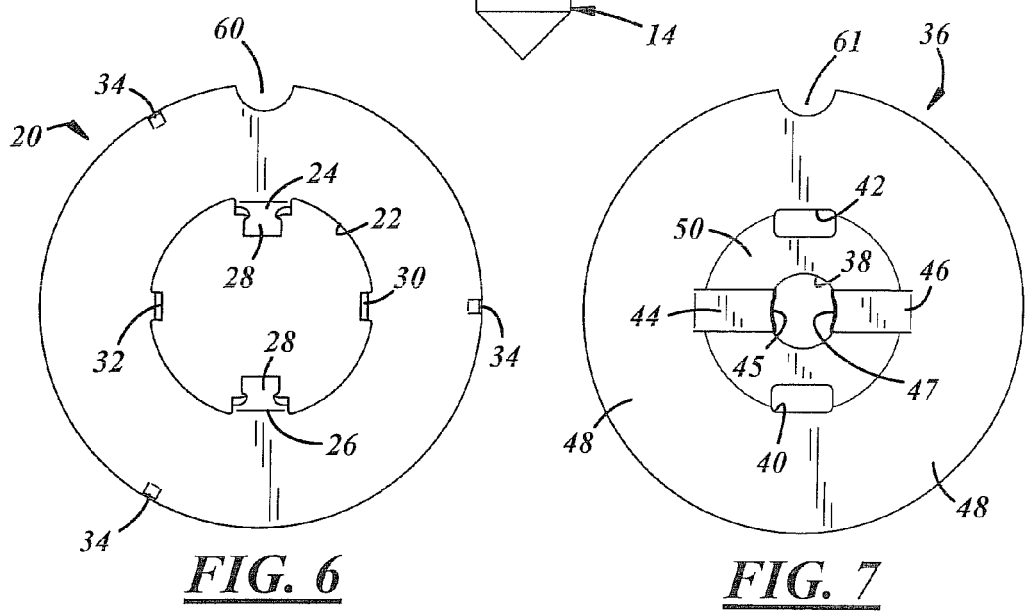
FIG. 6  FIG. 7

DEVICE FOR SECURING A PANEL TO A MOUNTING STUD

The present disclosure is directed to a device for securing a panel or the like to a mounting stud having external teeth.

BACKGROUND AND SUMMARY OF THE DISCLOSURE

There are many applications in industry in which it is desirable to mount a panel or the like to a stud. For example, in the automotive industry, an insulator panel must be mounted to studs on the underside of the body to help insulate the body interior from heat generated by catalytic converters, exhaust lines, mufflers, etc. Such mounting currently is performed using nuts and externally threaded studs, which can be difficult particularly when done "blind" from the side of the vehicle body. It is a general object of the present disclosure to provide a device for securing a panel or the like to a mounting stud having external teeth.

The disclosure embodies a number of aspects that can be implemented separately from or in combination with each other.

A device for securing a panel or the like to a mounting stud having external teeth, in accordance with one aspect of the present disclosure, includes an annular first body having an inner periphery and at least one lock finger extending from such inner periphery. An annular second body has a center opening, at least one lock opening spaced from the center opening for receiving the lock finger to lock the first and second bodies together, and at least one leg extending inwardly overlying the center opening for engaging the external teeth on the mounting stud. The second body is adapted for assembly to the first body with a panel or the like between the bodies such that the center opening can be mounted over the mounting stud with the at least one finger engaging the teeth on the mounting stud to prevent removal.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a fragmentary exploded perspective view of a mounting device in accordance with an exemplary embodiment of the present disclosure assembled to a panel;

FIG. 2 is an exploded perspective view of a panel and mounting device in accordance with the exemplary embodiment of FIG. 1 aligned for securement to a mounting stud with external teeth;

FIG. 3 is a sectional view taken substantially along the line 3-3 in FIG. 2;

FIG. 4 is a sectional view on an enlarged scale of the portion of FIG. 3 within the circle 4;

FIG. 5 is a sectional view taken substantially along the line 5-5 in FIG. 2; and FIGS. 6 and 7 are top plan views of respective components of the mounting device illustrated in FIGS. 1-5.

DETAILED DESCRIPTION OF PREFERRED EMBODIMENTS

The drawings illustrate a device 10 that is particularly well adapted for securing a panel 12 to a mounting stud 14 with external teeth 16. In the specific example illustrated in the drawings, panel 12 is an insulating panel to be mounted to a stud 14 welded or otherwise secured to the underside of a vehicle body shell 18. External teeth 16 on stud 14 may comprise external threads, annular external teeth, segmented external teeth or the like.

Device 10 includes an annular first body 20 having an inner periphery 22 and at least one lock finger 24 extending from inner periphery 22. There preferably are a pair of diametrically opposed lock fingers 24, 26 extending from inner periphery 22, with each lock finger preferably having a reverse-angle end 28. Fingers 24, 26 preferably are substantially parallel with each other, as best seen in FIG. 5. There also preferably are a pair of diametrically opposed stop fingers 30, 32 extending from inner periphery 22 at 90° spacing with respect to fingers 24, 26. The annular portion of body 20 preferably is flat, and most preferably has angularly spaced barbs or teeth 34 around its outer periphery to prevent rotation with respect to panel 12. There is a recess or notch 60 in the outer edge of body 20, preferably radially aligned with finger 24.

A second annular body 36 has a center opening 38. At least one lock opening 40 is spaced from center opening 38. There preferably are a pair of diametrically spaced lock openings 40, 42 on opposite sides of center opening 38 for receiving respective lock fingers 24, 26 of body 20. Openings 40, 42 preferably are substantially rectangular, as best seen in FIGS. 1 and 7. At least one leg 44 extends inwardly and overlies center opening 38. There preferably are a pair of diametrically opposed legs 44, 46 that extend inwardly from the peripheral portion of body 36, having inner ends overlying and aligned with center opening 38. Legs 44, 46 preferably are at an acute angle to the axis of center opening 38, such as an acute angle of 50° for example. The opposed inner ends 45, 47 of legs 44, 46 preferably are arcuate and concave on a common circle, as best seen in FIGS. 1 and 7, for engaging the external teeth on the rounded contour of stud 14. There is a recess or notch 61 in the outer edge of body 36, preferably aligned with opening 42. Recesses 60, 61 facilitate correct alignment of fingers 24, 26 with openings 42, 40 during automated assembly.

Annular body 36 preferably has an essentially flat outer portion 48 and a slightly domed inner portion 50. Annular bodies 20, 36 preferably are of suitable spring steel construction and can be made in an otherwise conventional blanking and bending operation. This contour of body 36 helps assure that body 36 holds panel 12 against the vehicle underbody even under extremes of thermal expansion and contraction.

In assembly, an opening 52 is provided in panel 12 at a desired mounting location. First body 20 is aligned on the backside of panel 12 and fingers 24, 26, 30, 32 extend into opening 52. Second body 36 is then assembled over panel 12 with fingers 24, 26 extending into openings 42, 40. The angled ends 28 of fingers 24, 26 snap through openings 42, 40 as best seen in FIGS. 2 and 5, and prevent removal. The dimensions of fingers 24, 26, 30, 32, and the spacings among the legs, preferably are such that the assembly of bodies 20, 36 freely "floats" with respect to panel 12 between limits defined by abutment of fingers 24, 26, 30, 32 with the inner periphery of panel opening 52. Panel 12 can then be assembled to stud 14 by aligning center opening 38 of body 36 with stud 14, and pushing the panel and the bodies over the mounting stud. The "float" of the mounting device with respect to the panel facilitates this assembly operation by accommodating variations in stud location on the vehicle underbody. The device 10 is self-aligning to variations in location of stud 14 on underbody 18. The amount of "float" is determined by the size of panel opening 52.

The designs of legs 44, 46 results in low required installation force over stud 14. This installation can be carried out mechanically or manually. The ends of legs 44, 46, which preferably are arcuate and concave as previously described, engage teeth 16 on stud 14 and prevent removal of the panel. Legs 44, 46 and ends 45, 47 could be employed in conjunction with a stud 14 having a (less preferred) smooth outer surface in place of teeth or threads 16. However, studs 14 having external teeth, ridges or threads 16 are preferred. Peripheral teeth 34, on bodies 20, 36 dig into the panel, as best seen in FIGS. 3 and 4, to help hold the panel against rotation with respect to the mounting device and the stud. This helps prevent the bodies 20, 36 from simply unthreading from stud 14 due to vibration of the vehicle body and panel 12.

The inside edge diameter of inner periphery 22 on body 20 preferably is sized for clearance receipt over the annular base flange 62 of stud 14. This feature allows some "float" of panel 12 with respect to body shell 18 while ensuring that panel 12 is flush against body 18. This prevents dirt, debris, water and/or ice from accumulating between panel 12 and body 18, which otherwise could cause squeaks, rattles, premature insulator failure or rust.

There thus has been disclosed a device for securing a panel to a mounting stud, which fully satisfies all of the objects and aims previously set forth. The device has been disclosed in conjunction with a presently preferred exemplary embodiment, and modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A product including:
a panel having an opening therein,
a mounting stud extending through said opening of said panel and having external teeth,
an annular first body disposed on a side of said panel and having an inner periphery and a pair of lock fingers extending from said inner periphery into said opening, and
an annular second body disposed on an opposite side of said panel and having a center opening, a pair of lock openings spaced from said center opening for receiving said lock fingers to lock said first and second annular bodies together with said panel disposed between said first and second annular bodies, and at least one leg extending inwardly overlying said center opening for engaging said external teeth on the mounting stud,
wherein said opening in said panel has a diameter that is greater than spacing between said lock fingers such that said bodies float with respect to said panel.

2. The product set forth in claim 1 wherein each of said lock fingers has a reverse-angle end to lock said fingers in said lock openings.

3. The product set forth in claim 1 wherein said first body has diametrically opposed stop fingers extending from said inner periphery at 90° spacing from said lock fingers.

4. The product set forth in claim 1 wherein said first body has a pair of stop fingers and said lock fingers and said stop fingers are on a common circle around said inner periphery to limit lateral movement of said bodies with respect to the panel when said bodies are mounted to the panel.

5. The product set forth in claim 1 wherein said at least one leg of said second body includes diametrically opposed legs extending inwardly and overlying said center opening.

6. The product set forth in claim 5 wherein said legs are at an acute angle to an axis of said center opening.

7. The product set forth in claim 6 wherein said legs have concave arcuate ends.

8. The product set forth in claim 1 wherein said first body is substantially flat and said second body has a substantially flat periphery.

9. The product set forth in claim 1 wherein at least one of said bodies has at least one tooth for digging into the panel and preventing rotation of said bodies with respect to the panel.

10. The product set forth in claim 1 wherein said stud has a base flange, and wherein said inner periphery of said first body is of sufficient diameter for receipt over said base flange.

11. The product set forth in claim 1 wherein said second body has a domed contour.

12. The product set forth in claim 11 wherein said first and second bodies are metal.

13. The product set forth in claim 11 wherein said lock fingers extend through said domed contour of said second body.

14. The product set forth in claim 1 wherein said first and second bodies include recesses in outer edges thereof and aligned with said openings to facilitate correct alignment of said fingers with said openings.

* * * * *